United States Patent
Salter et al.

(10) Patent No.: US 11,718,354 B2
(45) Date of Patent: Aug. 8, 2023

(54) VEHICLE WITH BODY PANEL INCLUDING FLEXIBLE FABRIC

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Robert Walsh, Novi, MI (US); Jacob Michael Haspiel, Ann Arbor, MI (US); Daveanand M. Singh, Detroit, MI (US); Joseph Ian Halaszynski, Farmington Hills, MI (US); Jesse Rene Diephuis, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 17/331,741

(22) Filed: May 27, 2021

(65) Prior Publication Data

US 2022/0379696 A1    Dec. 1, 2022

(51) Int. Cl.
*B62D 33/023*    (2006.01)
*B60J 7/10*    (2006.01)

(52) U.S. Cl.
CPC ............ *B62D 33/023* (2013.01); *B60J 7/102* (2013.01)

(58) Field of Classification Search
CPC ................. B60J 7/10; B60J 7/102; B60J 7/11
See application file for complete search history.

(56) References Cited

U.S. PATENT DOCUMENTS

| | | | | |
|---|---|---|---|---|
| 2,682,427 A * | 6/1954 | Bright | .................... | B60J 5/0487 135/117 |
| 5,799,992 A * | 9/1998 | Kojima | .................... | B60J 11/06 293/DIG. 6 |
| 6,565,139 B2 * | 5/2003 | Bayerle | .................... | B60J 11/00 296/159 |
| 7,066,526 B2 * | 6/2006 | Weddington | ............. | B60J 7/102 296/105 |
| 7,137,660 B2 * | 11/2006 | Weddington | ........... | A45B 23/00 296/105 |
| 7,490,885 B1 * | 2/2009 | Konet | .................... | B60J 1/1892 296/26.04 |
| 9,067,482 B1 * | 6/2015 | Ferlinghetti | ............. | B60J 11/06 |
| 9,423,114 B1 * | 8/2016 | Malina | .................... | F21L 4/085 |
| 10,253,521 B2 * | 4/2019 | Choi | ....................... | E04H 15/32 |
| 10,259,509 B2 * | 4/2019 | Marchlewski | ........... | B60Q 1/30 |
| 10,458,756 B2 * | 10/2019 | Whitaker | ................ | F41H 5/013 |
| 2002/0038962 A1 * | 4/2002 | Perez | ....................... | B60J 7/102 296/136.07 |

(Continued)

FOREIGN PATENT DOCUMENTS

FR      3006288 A1    12/2014

*Primary Examiner* — Jason S Morrow
(74) *Attorney, Agent, or Firm* — Vichit Chea; Carlson, Gaskey & Olds, P.C.

(57) ABSTRACT

An example vehicle includes a frame and a body panel attached to the frame and providing an exterior surface of the vehicle. The body panel includes a flexible fabric material. This provides a number of benefits, including providing a resilient, lightweight, and customizable body panel. These and other benefits will be appreciated from the detailed description and drawings.

16 Claims, 9 Drawing Sheets

(56) References Cited

U.S. PATENT DOCUMENTS

| | | | |
|---|---|---|---|
| 2004/0021333 A1* | 2/2004 | Hancock | B60J 7/10 |
| | | | 296/79 |
| 2006/0261633 A1 | 11/2006 | Winborn | |
| 2014/0312647 A1* | 10/2014 | Wang | B60J 11/04 |
| | | | 296/136.02 |
| 2016/0207383 A1* | 7/2016 | Tyrer | B60J 7/10 |
| 2018/0111458 A1* | 4/2018 | Cretikos | B60J 7/10 |
| 2019/0162008 A1 | 5/2019 | Migaki et al. | |
| 2019/0241048 A1 | 8/2019 | Xu | |
| 2019/0248218 A1 | 8/2019 | Bell et al. | |
| 2021/0002438 A1* | 1/2021 | Selvaganapathy | C08J 5/249 |
| 2021/0221203 A1* | 7/2021 | Demming | B60J 7/10 |
| 2022/0009555 A1* | 1/2022 | Salter | B60Q 1/326 |

* cited by examiner

VEHICLE WITH BODY PANEL INCLUDING FLEXIBLE FABRIC

TECHNICAL FIELD

This disclosure relates to a motor vehicle with a body panel including a flexible fabric.

BACKGROUND

Pickup trucks typically include an enclosed cab and a cargo area (or cargo box) having a bed, side walls extending along opposite sides of the bed, and a tailgate. The sides of the bed are known to include a frame and panels supported by the frame. The panels on an outside of the frame are made of a rigid material, typically metal, and provide an exterior surface of the pickup truck.

SUMMARY

A vehicle according to an exemplary aspect of the present disclosure includes, among other things, a frame and a body panel attached to the frame and providing an exterior surface of the vehicle. The body panel includes a flexible fabric material.

In a further non-limiting embodiment of the foregoing vehicle, the flexible fabric material includes at least one sheet of fabric.

In a further non-limiting embodiment of any of the foregoing vehicles, the sheet of fabric is made of an ultra-high-molecular-weight polyethylene (UHMWPE).

In a further non-limiting embodiment of any of the foregoing vehicles, the body panel includes at least one rigid stay.

In a further non-limiting embodiment of any of the foregoing vehicles, the body panel includes a plurality of rigid stays.

In a further non-limiting embodiment of any of the foregoing vehicles, the at least one sheet of fabric includes a plurality of sheets of fabric, each of the sheets of fabric are made of UHMWPE, adjacent ones of the sheets of fabric are connected so as to form a plurality of elongate pockets, and each of the elongate pockets includes one of the rigid stays.

In a further non-limiting embodiment of any of the foregoing vehicles, rigid supports are attached to the frame between the body panel and the frame, and one or both of the rigid supports and the frame includes fasteners configured to facilitate attachment of the body panel to the frame without the use of tools.

In a further non-limiting embodiment of any of the foregoing vehicles, the fasteners include a strip of a hook-and-loop fastener and the body panel includes a corresponding strip of a hook-and-loop fastener.

In a further non-limiting embodiment of any of the foregoing vehicles, the fasteners includes openings configured to receive straps of the body panel.

In a further non-limiting embodiment of any of the foregoing vehicles, the frame includes a through-opening, and when mounted to the frame, the body panel completely covers the through-opening.

In a further non-limiting embodiment of any of the foregoing vehicles, a pouch is mounted in the through-opening.

In a further non-limiting embodiment of any of the foregoing vehicles, the body panel is expandable and retractable along at least one dimension of the body panel.

In a further non-limiting embodiment of any of the foregoing vehicles, the vehicle is a pickup truck, and the body panel provides an exterior surface of a bedside panel of the pickup truck.

In a further non-limiting embodiment of any of the foregoing vehicles, the vehicle is a sport utility vehicle, and the body panel provides an exterior surface of a rear quarter panel of the vehicle.

In a further non-limiting embodiment of any of the foregoing vehicles, the body panel includes an electrical device.

In a further non-limiting embodiment of any of the foregoing vehicles, the electrical device includes at least one of a light emitting diode, a printed circuit, electroluminescent wire, and conductive wire.

A method according to an exemplary aspect of the present disclosure includes, among other things, attaching a body panel including a flexible fabric material to a frame of a vehicle.

In a further non-limiting embodiment of the foregoing method, the method includes removing the body panel from the frame, and retracting the body panel in at least one dimension to a retracted state.

In a further non-limiting embodiment of any of the foregoing methods, the method includes expanding the body panel to an expanded state from the retracted state and re-attaching the body panel to the frame.

In a further non-limiting embodiment of any of the foregoing methods, the attaching step includes attaching the body panel to the frame using fasteners and without using tools.

DETAILED DESCRIPTION

This disclosure relates to a vehicle with a body panel including a flexible fabric. An example vehicle includes a frame and a body panel attached to the frame and providing an exterior surface of the vehicle. The body panel includes a flexible fabric material. This disclosure provides a number of benefits, including providing a resilient, lightweight, and customizable body panel. These and other benefits will be appreciated from the below description.

Figure 1:
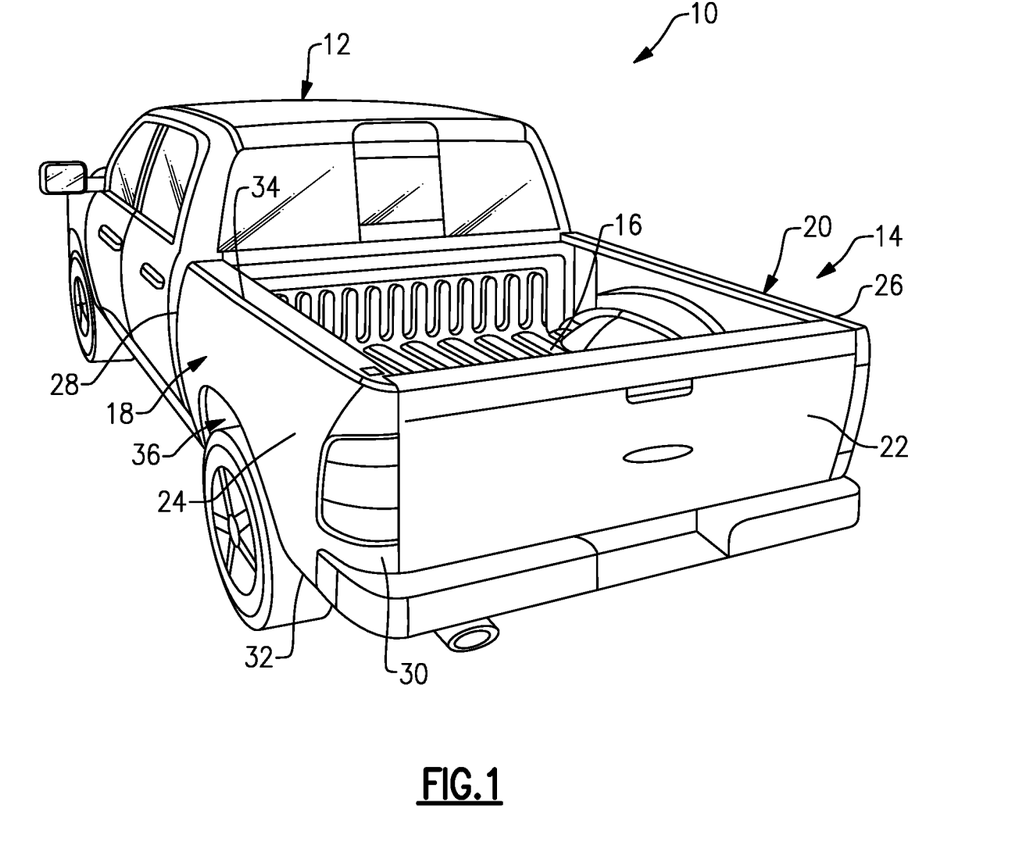
FIG. 1 is a rear-perspective view of a motor vehicle, which in this example is a pickup truck.

FIG. 1 illustrates a motor vehicle 10 ("vehicle 10"), which in this example is a pickup truck. While particularly beneficial in the context of pickup trucks, this disclosure could extend to other vehicles besides pickup trucks, such as sport utility vehicles (SUVs).

The vehicle 10 includes a passenger cabin 12 and, rearward of the passenger cabin 12, a cargo area 14. The cargo area 14 is an open-topped cargo area in this example. In other examples, the cargo area 14 can be closed by a moveable cover, such as a tonneau cover, or a fixed cover, such as a truck cap.

The cargo area 14 includes bottom surface, or bed 16, a first side 18 extending along a first side of the bed 16, a second side 20 extending along a second side of the bed 16 opposite the first side of the bed 16, and tailgate 22. In FIG. 1, the tailgate 22 is in a closed position. The tailgate 22 is configured to swing relative to the sides 18, 20 between the upright, closed position of FIG. 1 and a substantially horizontal, open position. When in the closed position, the tailgate 22 encloses the cargo area 14 from the rear. When open, a user may access to the cargo area 14 from the rear.

In FIG. 1, the first and second sides 18, 20 include first and second bedside panels 24, 26, respectively. The first and second bedside panels 24, 26 are mounted to outer sides of respective portions of the frame of the vehicle 10. The first and second bedside panels 24, 26 provide an exterior surface of the vehicle 10.

With respect to the first bedside panel 24, the first bedside panel 24 exhibits a length from a front edge 28 adjacent a rear of the passenger cabin 12 to a rear edge 30 adjacent the tailgate 22. Further, the first bedside panel 24 exhibits a height between a bottom edge 32 and a top edge 34. The bottom edge 32 is contoured along its length to accommodate a wheel well 36. The second bedside panel 26 is arranged substantially similar to the first bedside panel 24.

Figure 2:
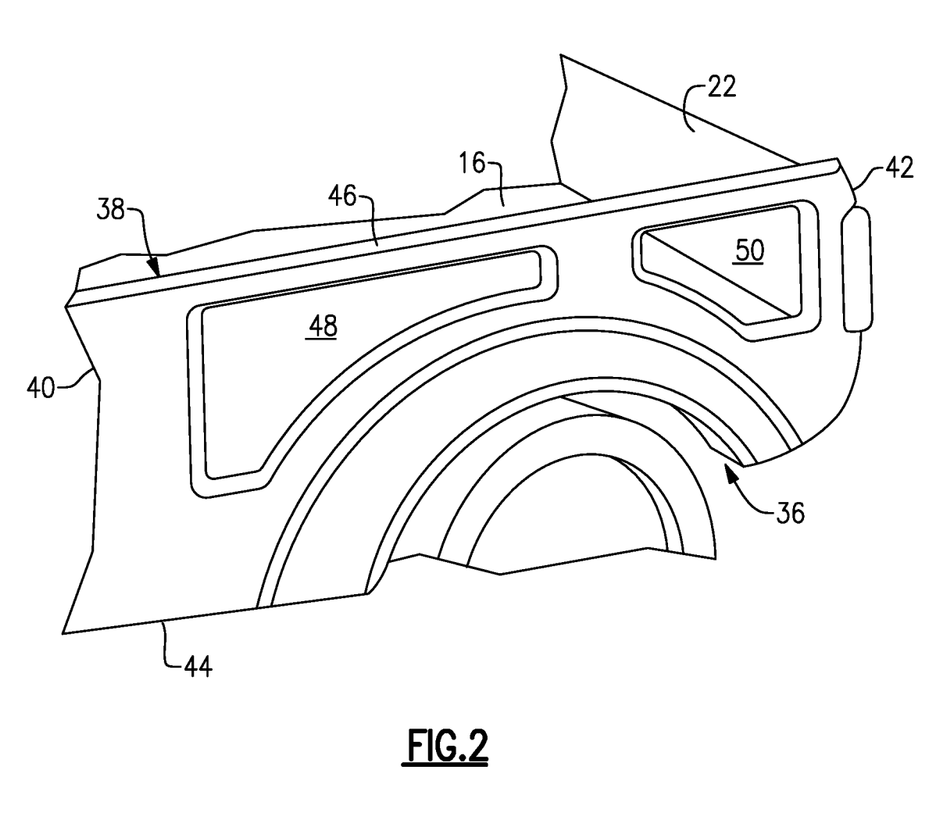
FIG. 2 is a side view of a portion of the vehicle with a bedside panel removed such that a frame underlying the bedside panel is visible.

FIG. 2 illustrates the frame 38 underlying the first bedside panel 24. A similar frame is underlying the second bedside panel 26. The frame 38 exhibits a length between a front edge 40 adjacent a rear of the passenger cabin 12 and a rear edge 42 adjacent the tailgate 22. Further, the frame 38 exhibits a height between a bottom edge 44 and a top edge 46. The bottom edge 44 is contoured along its length to accommodate the wheel well 36. The frame 38 is made of a metallic material, such as aluminum, and is rigid. In this disclosure, the term rigid refers to structures that are not easily bendable.

The frame 38 includes two through-openings 48, 50, in this example, providing access from an exterior location to the bed 16. The first bedside panel 24 is sized and shaped to correspond to the frame 38 and such that when the first bedside panel 24 is attached to the frame 38, the entire frame 38 and the through-openings 48, 50 are covered by the first bedside panel 24 from an exterior perspective.

This disclosure relates to flexible body panels. In an example, the first bedside panel 24 is a flexible body panel. While bedside panels are mentioned herein, this disclosure extends to other body panels, such as panels associated with the tailgate 22, or panels associated with a part of the vehicle 10 other than the cargo area 14. Further, this disclosure applies to body panels for vehicles that are not pickup trucks. Specifically, this disclosure extends to SUVs and the body panel could provide a rear quarter panel of an SUV, as an example.

Figure 3:
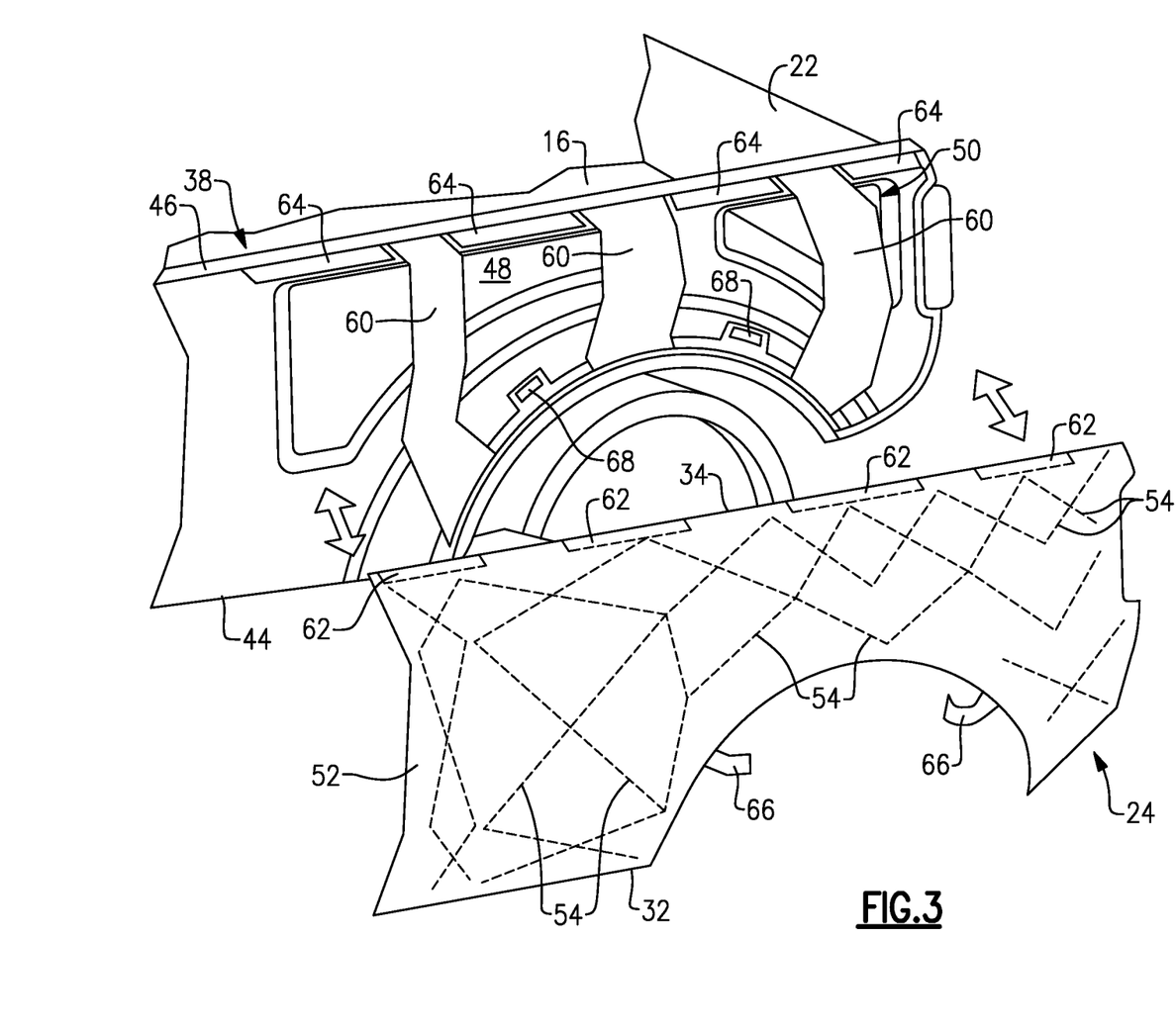
FIG. 3 is a side view of the portion of the vehicle and illustrates an example bedside panel relative to the frame.
Figure 4:
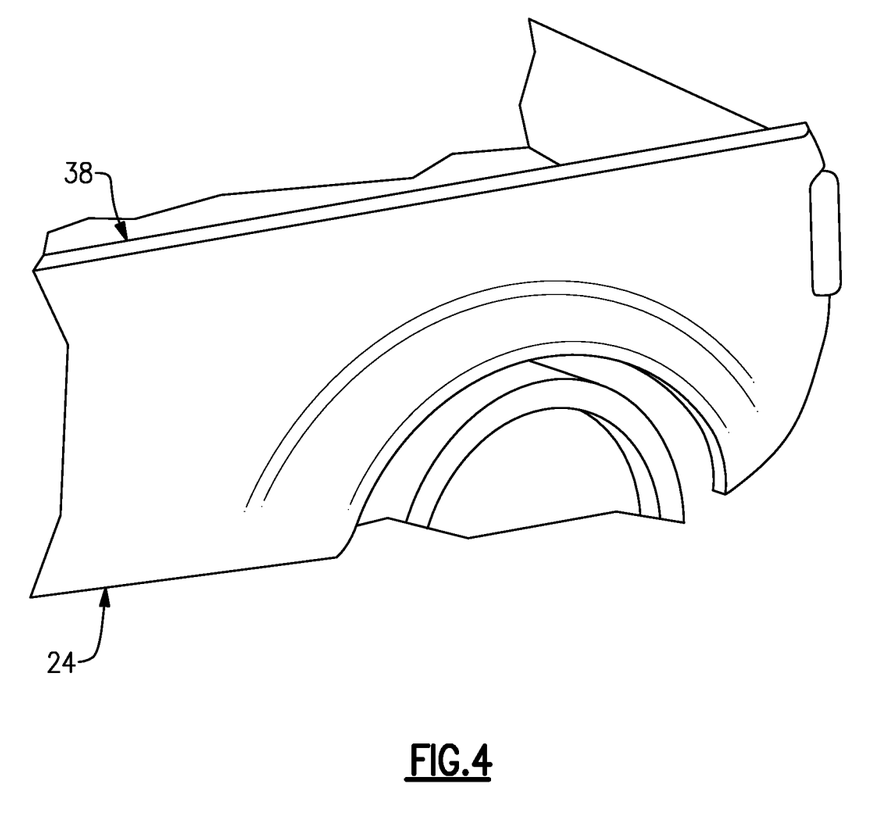
FIG. 4 is a side view of the portion of the vehicle with the bedside panel attached to the frame.

FIG. 3 illustrates an example first bedside panel 24 relative to the frame 38. The second bedside panel 26 may be configured similarly. In FIG. 3, the first bedside panel 24 is detached from the frame 38. In FIG. 4, the first bedside panel 24 is attached to the frame 38. In this regard, the first and second bedside panels 24, 26 are intended to be removable body panels. A user can, for example, remove the original body panels of the vehicle 10, which may be configured as standard body panels which are significantly more rigid than the first and second bedside panels 24, 26. The flexibility provided by the first and second bedside panels 24, 26 has a number of benefits, such as when the vehicle 10 is used for off-roading. Not only are the first and second bedside panels 24, 26 flexible, they are also resilient. The flexible yet resilient nature of the first and second bedside panels 24, 26 protects the contents of the bed 16 while resisting scratching and preserving the look of the first and second bedside panels 24, 26. Further, the original body panels of the vehicle 10 are preserved, as they are not used during off-roading, and they can be reattached to the vehicle 10 after off-roading. The first and second bedside panels 24, 26 provide a number of other benefits, such as offering customizability, reducing the weight of the vehicle 10, etc.

With reference to FIG. 3, an example configuration of the first bedside panel 24 and the frame 38 will be described. The configuration is exemplary of other panels and frames elsewhere on the vehicle 10, such as the configuration of the second bedside panel 26. The first bedside panel 24 includes at least one sheet of flexible fabric material, labeled as fabric sheet 52. The fabric sheet 52 could include a plurality of sheets of flexible fabric material, including a plurality of sheets of the same type of material layered and attached together such as by laminating or stitching. In an example, the fabric sheet 52 is provided by at least one sheet of ultra-high-molecular-weight polyethylene (UHMWPE) fabric. UHMWPE is flexible yet resilient. As such, the fabric sheet 52 is able to flex when the first bedside panel 24 comes into contact with objects such as limbs, rocks, etc., during off-roading. While UHMWPE is mentioned, this disclosure extends to other materials. In this disclosure, the term flexible is used to refer to bending easily without breaking.

A plurality of structures are used to hold the fabric sheet 52 in a desired shape. In this example, there are a plurality of structures holding the fabric sheet 52 in the shape of the first bedside panel 24. In this disclosure, some of these structures are attached to the fabric sheet 52 itself, and others are attached to the frame 38.

In this example, the fabric sheet 52 includes a plurality of rigid stays 54 within the fabric sheet 52. The rigid stays 54 are relatively long, thin rods which exhibit a stiffness significantly greater than the fabric sheet 52. While the rigid stays 54 may be bendable, they are rigid such that they tend to return to their manufactured shape when deflected away from that shape. In this example, the rigid stays 54 are manufactured as relatively long, straight rods. The rigid stays 54 are arranged within the fabric sheet 52 so as to assist the fabric sheet 52 in holding a desired shape and in flexing back to that shape in response to an applied force. The rigid stays 54 apply tension to the fabric sheet 52. The rigid stays 54 may be attached to the inner surface of the fabric sheet 52, the outer surface of the fabric sheet 52, or, as in the example of FIG. 3, provided within the fabric sheet 52, specifically by being providing between adjacent layers of the fabric sheet 52.

Figure 5:
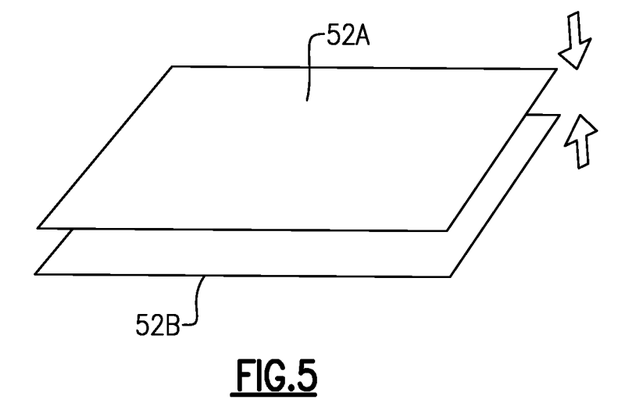
FIG. 5 illustrates two flexible fabric sheets relative to one another.
Figure 6:
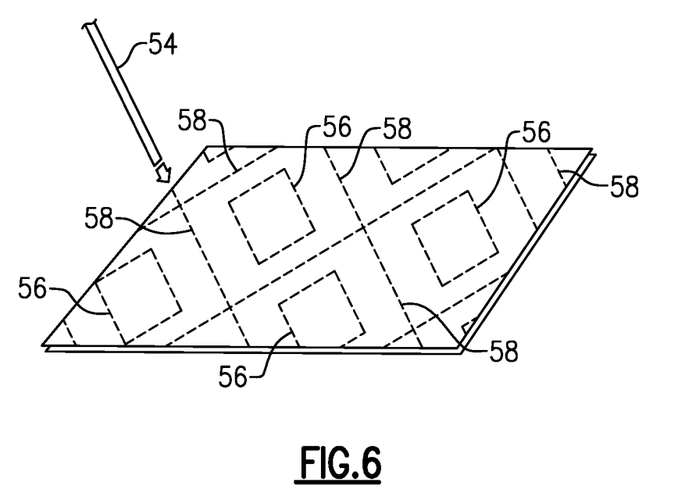
FIG. 6 illustrates seams provided relative to the flexible fabric sheets and a rigid stay being inserted into a pocket between the flexible fabric sheets.

With reference to FIGS. 5 and 6, an example the fabric sheet 52 includes first and second fabric sheets 52A, 52B, both made of UHMWPE. The fabric sheets 52A, 52B are arranged relative to one another, cut to the size of the first bedside panel 24, and sewn together such that they exhibit a plurality of seams 56. The seams 56 in FIG. 6 are substantially diamond-shaped in this example. The seams 56 provide a plurality of elongate pockets 58 between the fabric sheets 52A, 52B. The rigid stays 54 are inserted into the pockets 58 and the edges of the fabric sheets 52A, 52B are then sewn or glued together, for example. While an example technique for attaching the rigid stays 54 to the fabric sheet 52 has been described, this disclosure extends to other techniques.

With reference back to FIG. 3, the frame 38 also includes structures configured to hold the shape of the fabric sheet 52. Specifically, the frame 38 includes a plurality of vertically-extending supports 60 extending from generally the bottom edge 44 to the top edge 46. There are three supports 60 in FIG. 3, but this disclosure extends to configurations with a different quantity of supports. The supports 60 may be attached to the frame using tool-free fasteners, such as quarter-turn fasteners.

Each of the supports 60 is spaced-apart from one another along the length of the frame 38. The supports 60 each at least partially overlap one of the through-openings 48, 50 to prevent wind, for example, from deflecting the fabric sheet 52 into the through-openings 48, 50. The supports 60 may be metallic or plastic. The supports 60 are significantly more rigid than the fabric sheet 52. While supporting structures, namely the rigid stays 54 and supports 60, are provided relative to both the fabric sheet 52 and the frame 38 in this example, this disclosure extends to other arrangements of supporting structures.

In this disclosure, the first bedside panel 24 is attachable to and detachable from the frame 38 using tool-free fasteners. Specifically, a user can attach and remove the first bedside panel 24 relative to the frame 38 by hand and without the use of tools. Example tool-free fasteners include hook-and-loop fasteners (i.e., Velcro®), button fasteners, straps, ratchets, etc. In FIG. 3, the first bedside panel 24 is attachable using more than one type of fastener. Specifically, adjacent the top edge 34 of the first bedside panel 24, the inner surface of the first bedside panel 24 includes a plurality of strips of hook-and-loop fastener material 62 which correspond to and are configured to attach to corresponding strips of hook-and-loop fastener material 64 provided adjacent the top edge 46 of the frame 38. Similar strips may be provided about the entire outer periphery of the first bedside panel 24 and the frame 38. Further, adjacent a bottom edge 32 of the first bedside panel 24, and specifically adjacent the location of the wheel well, the first bedside panel 24 includes a plurality of straps 66 configured to tie or attach to corresponding openings 68 of the frame 38. The straps 66 could be configured to tie to the openings 68 or to attach to the openings 66 in another manner, such as using hook-and-loop fasteners.

The through-opening 50 may include a pouch mounted therein. When present, the pouch is sized and shaped substantially similar to the through-opening 50. The pouch may be a zippered pouch and may be accessible from the bed 16 or an exterior of the vehicle 10. The pouch, in this example, is configured to store contents and is protected from an exterior by the rear-most support 60. The pouch may be rigid in this example. The through-opening 48 may include a pouch similar to the pouch.

Figure 7:
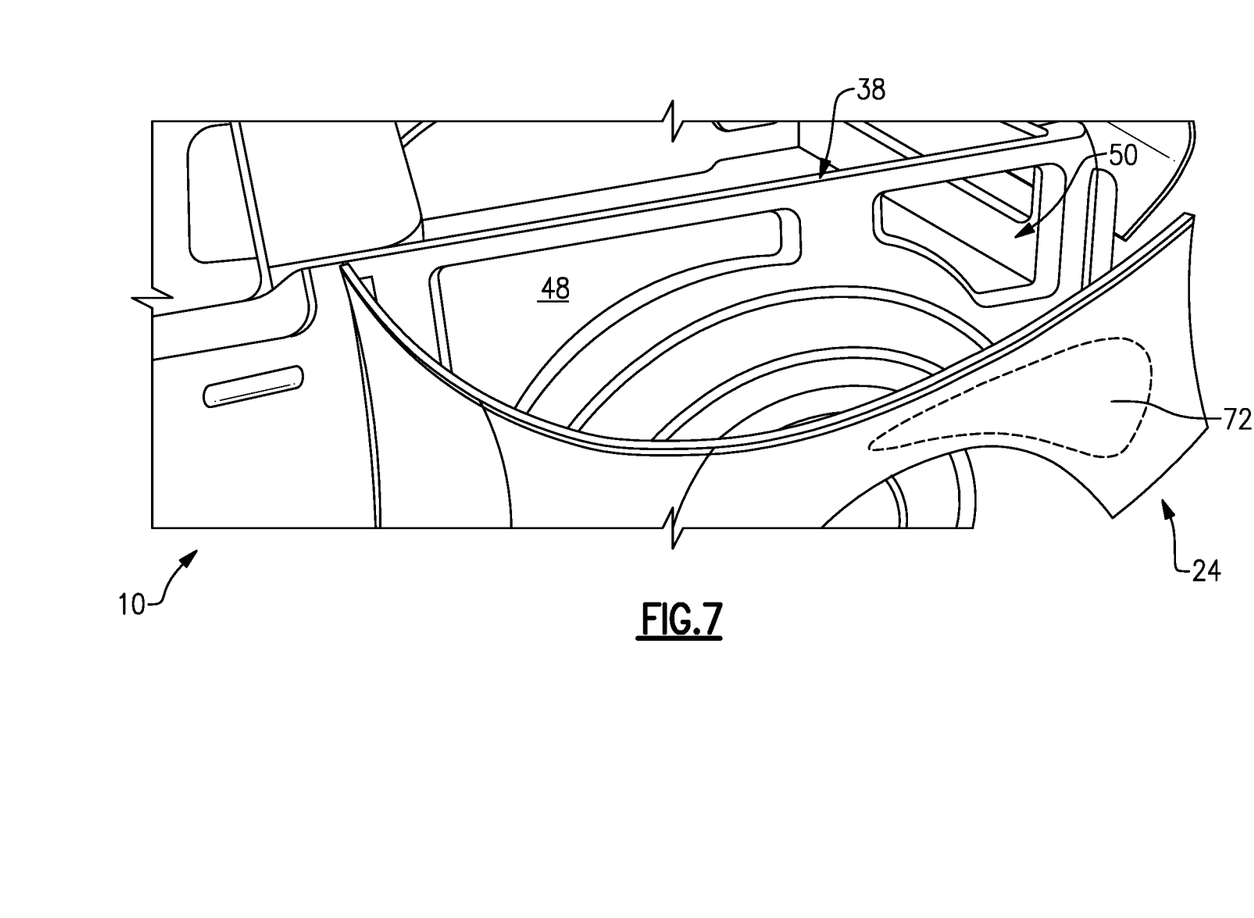
FIG. 7 illustrates an example in which a pouch is incorporated into the bedside panel.

In another example, as shown in FIG. 7, a pouch 72 may be incorporated into the first bedside panel 24. Specifically, the pouch 72 may be sewn or attached to an inner surface of the first bedside panel 24. The pouch 72 may be a zippered pouch accessible from the bed 16 or the exterior of the vehicle 10. The pouch 72 is sized and shaped to correspond to the through-opening 50. When filled with items, the pouch 72 fills the through-opening 50. In this regard, the pouch 72 may be made of a flexible fabric, such as the same fabric providing the fabric sheet 52. The first bedside panel 24 may alternatively or additionally include another pouch corresponding to through-opening 48.

Figure 8:
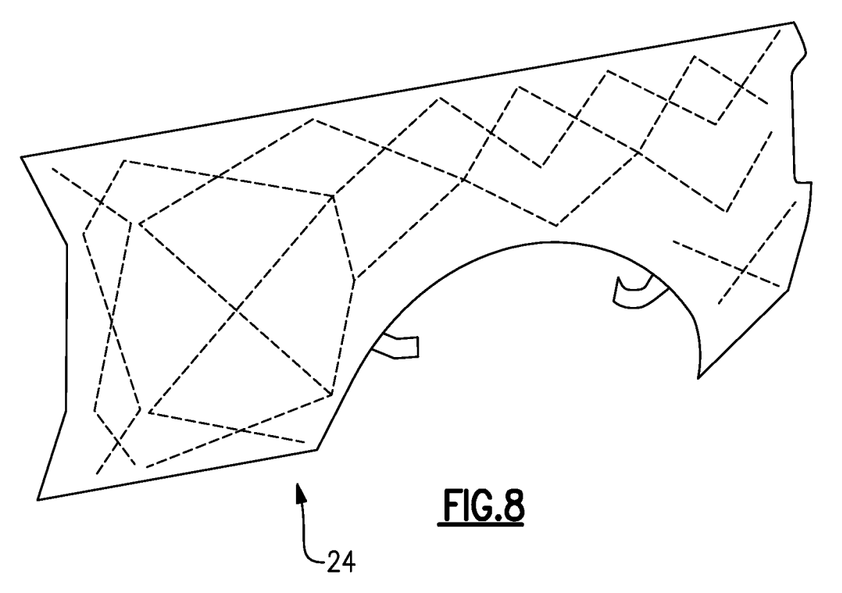
FIG. 8 illustrates the bedside panel in an expanded state.
Figure 9:
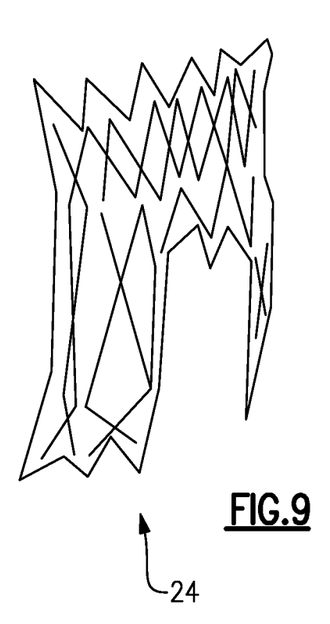
FIG. 9 illustrates the bedside panel in a retracted state.

The configuration of the first bedside panel 24 makes it such that the first bedside panel 24 is retractable. In FIG. 8, the first bedside panel 24 is shown in an expanded state, which is the position the first bedside panel 24 exhibits when mounted to the vehicle 10. In FIG. 9, the first bedside panel 24 is shown in a retracted state. In the retracted state, the first bedside panel 24 at least exhibits a reduced length dimension. The first bedside panel 24 also exhibits a reduced height dimension in this example. When in the retracted state, the first bedside panel 24 holds its retracted shape and is not biased to the expanded state. Thus, although the first bedside panel 24 includes rigid stays 54, the first bedside panel 24 does not take up undue space when stored.

Figure 10:
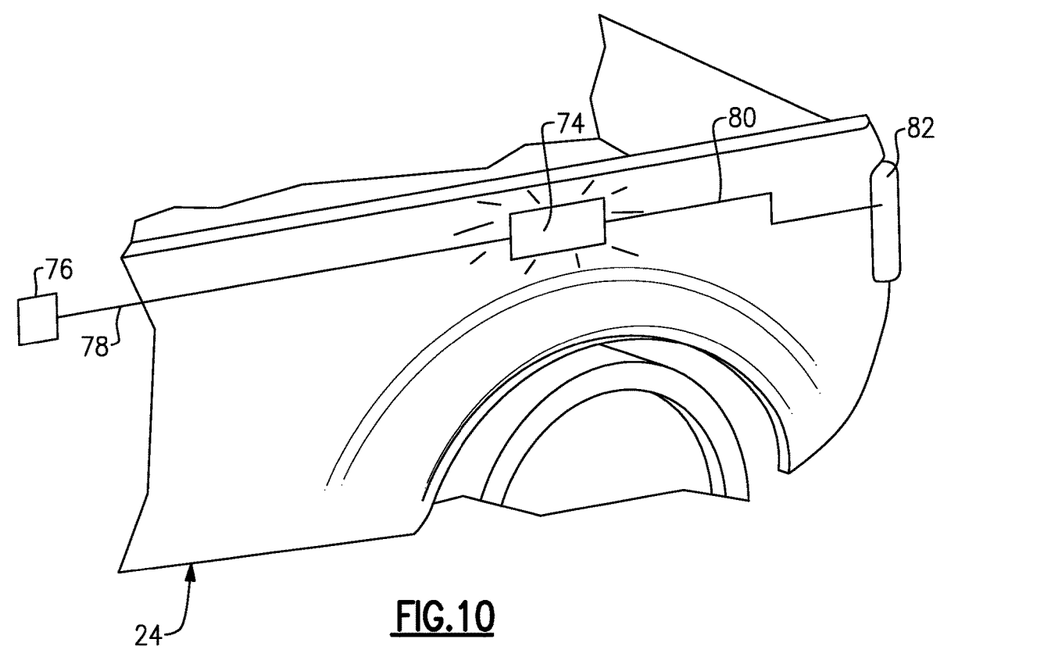
FIG. 10 illustrates the bedside panel including a first electrical component.
Figure 11:
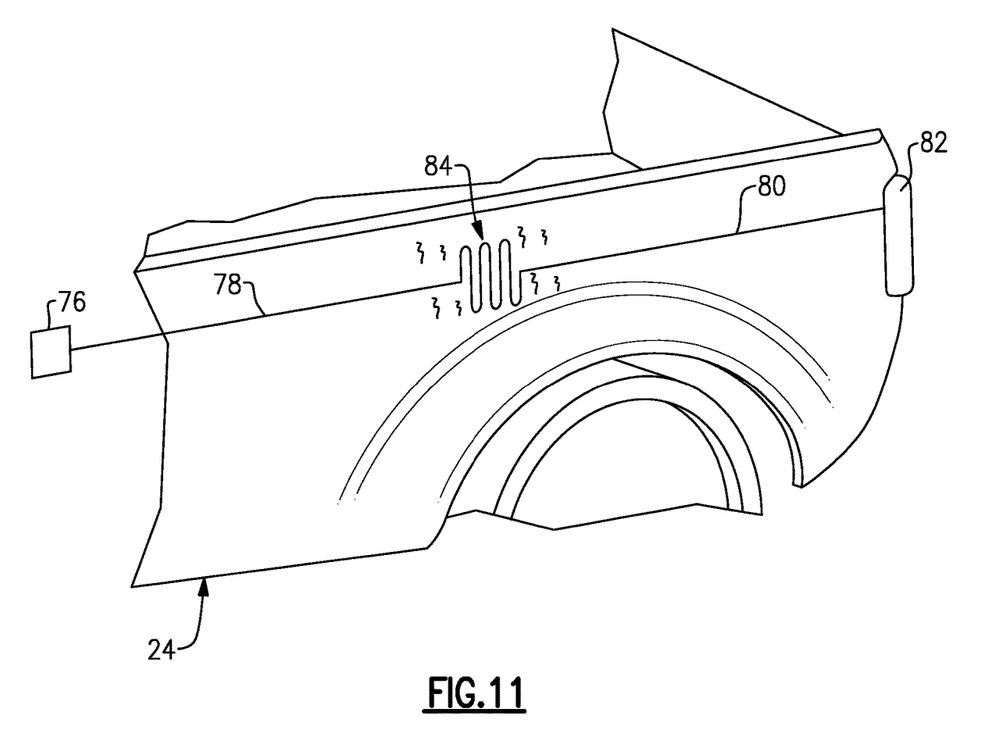
FIG. 11 illustrates the bedside panel including a second electrical component.

The first bedside panel 24 may also include one or more electrical devices. In particular, the first bedside panel 24 may include one or more electrical devices without compromising the flexible nature of the first bedside panel 24. FIGS. 10 and 11 illustrate example configurations in which the first bedside panel 24 incorporates electrical devices.

With respect to FIG. 10, the first bedside panel 24 includes a light 74. While one light is shown, additional lights may be provided. The light 74 is provided, in this example, by a flexible strip of printed light emitting diodes (LEDs), electroluminescent (EL) wire, or EL tape, as examples. The fabric sheet 52 may include an opening permitting the light to be emitted toward the exterior of the vehicle 10 and/or toward the bed 16. The light 74 is powered by a power source 76 and is connected to the power source 76 by an electrical connection, such as wire, wire tracing, or printed ink circuit, labeled as 78. The first bedside panel 24 may include another electrical connection 80 to other electrical components of the vehicle 10 such as rear tail lamps 82. In FIG. 11, the first bedside panel 24 includes a heater 84 provided by a conductive wire configured to heat the first bedside panel 24, which prevents the buildup of ice and/or snow on the first bedside panel 24. The rigid stays 54 prevent excessive bending of the first bedside panel 24, which protects the electrical components. While heaters and lights are mentioned herein, this disclosure extends to other electrical components within the flexible body panels.

It should be understood that terms such as "about," "substantially," and "generally" are not intended to be boundaryless terms, and should be interpreted consistent with the way one skilled in the art would interpret those terms. Further, directional terms such as "rear," "front," "top," "bottom," "side," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle, comprising:
   a frame; and
   a body panel attached to the frame and providing an exterior surface of the vehicle,
   wherein the body panel includes a flexible fabric material,
   wherein the vehicle is a pickup truck,
   wherein the body panel provides an exterior surface of a bedside panel of the pickup truck,
   wherein the frame includes a through-opening,
   wherein, when mounted to the frame, the body panel completely covers the through-opening, and
   wherein, when uncovered by the body panel, the through-opening provides access from an exterior location to a bed of the pickup truck.

2. The vehicle as recited in claim 1, wherein the flexible fabric material includes at least one sheet of fabric.

3. The vehicle as recited in claim 2, wherein the sheet of fabric is made of an ultra-high-molecular-weight polyethylene (UHMWPE).

4. The vehicle as recited in claim 3, wherein the body panel includes at least one rigid stay.

5. The vehicle as recited in claim 4, wherein the body panel includes a plurality of rigid stays.

6. A vehicle, comprising:
   a frame; and
   a body panel attached to the frame and providing an exterior surface of the vehicle,
   wherein the body panel includes a flexible fabric material,
   wherein the vehicle is a pickup truck,
   wherein the body panel provides an exterior surface of a bedside panel of the pickup truck,
   wherein the flexible fabric material includes at least one sheet of fabric,
   wherein the sheet of fabric is made of an ultra-high-molecular-weight polyethylene (UHMWPE)
   wherein the body panel includes a plurality of rigid stays,
   wherein the at least one sheet of fabric includes a plurality of sheets of fabric,
   wherein each of the sheets of fabric are made of UHMWPE,
   wherein adjacent ones of the sheets of fabric are connected so as to form a plurality of elongate pockets, and
   wherein each of the elongate pockets includes one of the rigid stays.

7. A vehicle, comprising:
   a frame; and
   a body panel attached to the frame and providing an exterior surface of the vehicle,
   wherein the body panel includes a flexible fabric material,
   wherein the vehicle is a pickup truck,
   wherein the body panel provides an exterior surface of a bedside panel of the pickup truck,
   wherein rigid supports are attached to the frame and are arranged between the body panel and the frame, and
   wherein one or both of the rigid supports and the frame includes fasteners configured to facilitate attachment of the body panel to the frame without the use of tools.

8. The vehicle as recited in claim 7, wherein the fasteners include a strip of a hook-and-loop fastener and the body panel includes a corresponding strip of a hook-and-loop fastener.

9. The vehicle as recited in claim 7, wherein the fasteners includes openings configured to receive straps of the body panel.

10. The vehicle as recited in claim 1, wherein a pouch is mounted in the through-opening.

11. The vehicle as recited in claim 1, wherein the body panel is expandable and retractable along at least one dimension of the body panel.

12. The vehicle as recited in claim 1, wherein the body panel includes an electrical device.

13. The vehicle as recited in claim 12, wherein the electrical device includes at least one of a light emitting diode, a printed circuit, electroluminescent wire, and conductive wire.

14. The vehicle as recited in claim 1, wherein the through-opening extends through the frame in a direction perpendicular to a centerline of the vehicle.

15. The vehicle as recited in claim 1, wherein the body panel is directly attached to the frame.

16. The vehicle as recited in claim 1, wherein a rigid support attached to the frame at least partially overlaps the through-opening.

* * * * *